(12) United States Patent
Zeng et al.

(10) Patent No.: US 7,894,408 B2
(45) Date of Patent: Feb. 22, 2011

(54) SYSTEM AND METHOD FOR DISTRIBUTING PROXYING ERROR INFORMATION IN WIRELESS NETWORKS

(75) Inventors: Surong Zeng, Altamonte Springs, FL (US); Keith J. Goldberg, Casselberry, FL (US); Avinash Joshi, Orlando, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1321 days.

(21) Appl. No.: 11/383,042

(22) Filed: May 12, 2006

(65) Prior Publication Data

US 2007/0266143 A1    Nov. 15, 2007

(51) Int. Cl.
*H04W 4/00* (2009.01)
(52) U.S. Cl. .................... 370/338; 709/224; 370/329
(58) Field of Classification Search .................. None
See application file for complete search history.

(56) References Cited

U.S. PATENT DOCUMENTS

| | | | |
|---|---|---|---|
| 5,946,381 A | 8/1999 | Danne et al. | |
| 6,473,408 B1 | 10/2002 | Rochberger et al. | |
| 6,701,361 B1 | 3/2004 | Meier | |
| 2001/0024443 A1 * | 9/2001 | Alriksson et al. | 370/401 |

OTHER PUBLICATIONS

C. Perkins et al—Ad Hoc On-Demand Distance Vector (AODV) Routing, The Internet Society, Jul. 2003, 35 pages.
PCT/US07/64982, International Search Report and Written Opinion, mailed Sep. 26, 2008, 7 pages.
PCT/US2007/064982, Preliminary Report on Patentability, mailed Nov. 27, 2008, 6 pages.

* cited by examiner

*Primary Examiner*—Phuoc Doan
(74) *Attorney, Agent, or Firm*—Randi L. Karpinia

(57) ABSTRACT

A system and method for distributing proxying error information in wireless networks is provided. The includes associating a proxy node with a non-routable node; sending a data packet from an initiator node to the proxy node for delivery to the non-routable node; determining by the proxy node that the non-routable device has disassociated from the proxy node; sending a proxy error message from the proxy node to the initiator node to inform the initiator node that the non-routable node is no longer proxied by the proxy node; and starting a route discovery process for the non-routable device by the initiator node.

8 Claims, 7 Drawing Sheets

| | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|
| 0 | VERSION NUMBER (8 BITS) | | | | | | | | TYPE (8 BITS) | | | | | | | |
| 1 | SOURCE ADDRESS (48 BITS)<br>(MESHED DEVICE) | | | | | | | | | | | | | | | |
| 2 | | | | | | | | | | | | | | | | |
| 3 | | | | | | | | | | | | | | | | |
| 4 | DESTINATION ADDRESS (48 BITS)<br>(MESHED DEVICE) | | | | | | | | | | | | | | | |
| 5 | | | | | | | | | | | | | | | | |
| 6 | | | | | | | | | | | | | | | | |
| 7 | UNREACHABLE TERMINATING ADDRESS (48 BITS)<br>(NON-MESHED DEVICE) | | | | | | | | | | | | | | | |
| 8 | | | | | | | | | | | | | | | | |
| 9 | | | | | | | | | | | | | | | | |

US 7,894,408 B2

SYSTEM AND METHOD FOR DISTRIBUTING PROXYING ERROR INFORMATION IN WIRELESS NETWORKS

FIELD OF THE INVENTION

The present invention relates generally to wireless communication networks and in particular to routing data in a wireless communication network.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node should maintain routing information collected through conversation with neighboring nodes. The routing information can also be periodically broadcast in the network to reflect the current network topology. Alternatively, to reduce the amount of information transmitted for maintaining accurate routing information, the network nodes may exchange routing information only when it is needed. In an approach known as Mesh Scalable Routing (MSR), nodes periodically send HELLO messages (e.g., once per second) that contain routing information and metrics associated with each route. Mobile nodes use information extracted from the HELLO messages to decide the most efficient manner for performing handoff.

A wireless mesh network is a collection of wireless nodes or devices organized in a decentralized manner to provide range extension by allowing radios to be reached across multiple hops. A large network can be realized by using infrastructure nodes intelligent access points (IAP), which provides wired backhaul to the wireless nodes. Multiple IAP can be connected to the same local area network (LAN) segment to provide wired backhaul.

Previous technologies provide methods and systems for routing data frames in a wireless network in which nodes are able to find one another even if they do not participate directly in routing. In these technologies, meshed routable devices in the network provide the proxy service to non-meshed non-routable devices, and represent those non-meshed devices associated with them to route data in the network to reach the destination. The accuracy of the proxy information is critical for routing the data frames for non-routable devices correctly. When the non-meshed device changes the attach point in the wireless network, it is desirable to inform the network of this change, especially the node which is communicating with the non-meshed device remotely.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
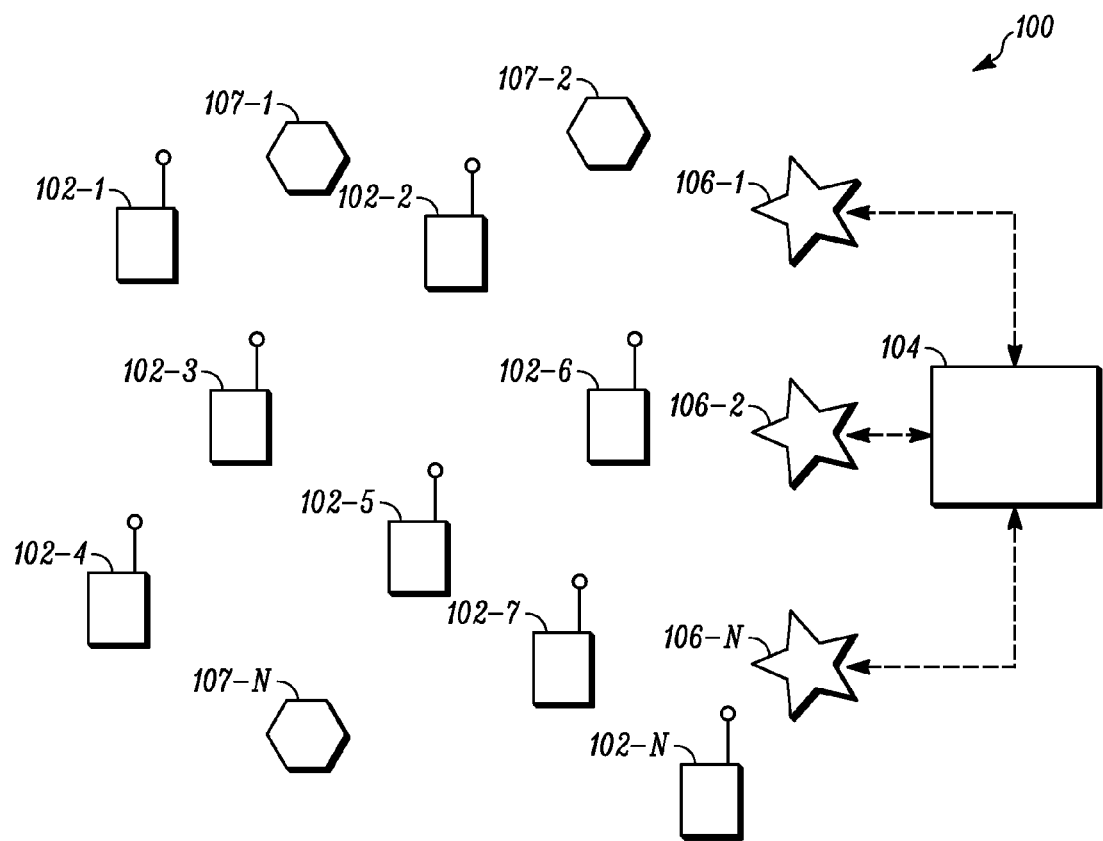
FIG. 1 is a block diagram of an example ad-hoc wireless communications network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to distributing proxying error information in wireless networks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of distributing proxying error information in wireless networks described herein. The non-processor circuits may include, but are not limited to, a radio receiver, a radio transmitter, signal drivers, clock circuits, power source circuits, and user input devices. As such, these functions may be interpreted as steps of a method to perform distribution of proxying error information in wireless networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides methods and systems for informing a source node and/or one or more intermediate nodes along a route about an attach point change of a destination node which is a non-meshed device.

The present invention includes the generation of a proxy error (PERR) packet from a destination meshed device to inform a source meshed device that a non-meshed terminator node is not proxied by the known destination meshed device. The PERR includes an initiator meshed device address, a destination meshed device address, and a moved terminator non-meshed device address. The PERR packet updates the proxy tables in the source meshed device and the intermediate devices along the route. Therefore, the obsolete proxy information gets purged in a timely way.

FIG. 1 is a block diagram illustrating an example of a communication network 100 employing an embodiment of the present invention. For illustration purposes, the communication network 100 comprises an adhoc wireless communications network. For example, the adhoc wireless communications network can be a mesh enabled architecture (MEA) network or an 802.11 network (i.e. 802.11a, 802.11b, 802.11g, or 802.11s) It will be appreciated by those of ordinary skill in the art that the communication network 100 in accordance with the present invention can alternatively comprise any packetized communication network. For example, the communication network 100 can be a network utilizing packet data protocols such as TDMA (time division multiple access), GPRS (General Packet Radio Service) and EGPRS (Enhanced GPRS).

As illustrated in FIG. 1, the communication network 100 includes a plurality of mobile nodes 102-1 through 102-n (referred to generally as nodes 102 or mobile nodes 102 or mobile communication devices 102), and can, but is not required to, include a fixed network 104 having a plurality of intelligent access points (IAP) 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed routers 107-1 through 107-n (referred to generally as nodes 107 or fixed routers 107 or fixed communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly, or via one or more other nodes 102, 106 or 107 operating as a router or routers for packets being sent between nodes.

Figure 2:
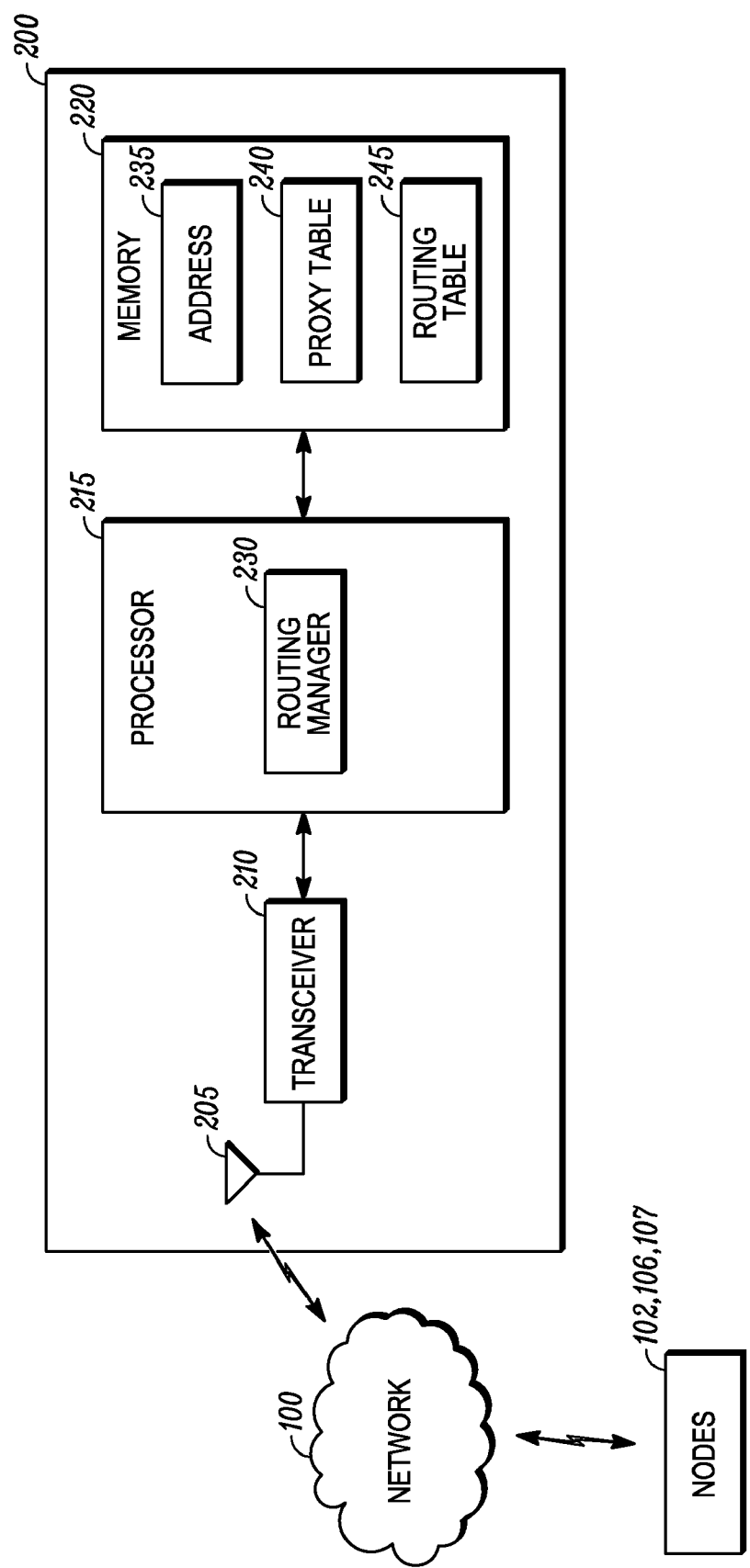
FIG. 2 is a block diagram illustrating an example of a mobile node employed in the network shown in FIG. 1.

FIG. 2 is an electronic block diagram of one embodiment of a communication device 200 in accordance with the present invention. The communication device 200, for example, can exemplify one or more of the nodes 102, 106, and 107 of FIG. 1. In accordance with some embodiments of the present invention, the communication device 200 can be a mesh routable device or alternatively can be a non-meshed non-routable device. As illustrated, the communication device 200 includes an antenna 205, a transceiver (or modem) 210, a processor 215, and a memory 220.

The antenna 205 intercepts transmitted signals from one or more nodes 102, 106, 107 within the communication network 100 and transmits signals to the one or more nodes 102, 106, 107 within the communication network 100. The antenna 205 is coupled to the transceiver 210, which employs conventional demodulation techniques for receiving and transmitting communication signals, such as packetized signals, to and from the communication device 200 under the control of the processor 215. The packetized data signals can include, for example, voice, data or multimedia information, and packetized control signals, including node update information. When the transceiver 210 receives a command from the processor 215, the transceiver 210 sends a signal via the antenna 205 to one or more devices within the communication network 100. In an alternative embodiment (not shown), the communication device 200 includes a receive antenna and a receiver for receiving signals from the communication network 100 and a transmit antenna and a transmitter for transmitting signals to the communication network 100. It will be appreciated by one of ordinary skill in the art that other similar electronic block diagrams of the same or alternate type can be utilized for the communication device 200.

IEEE 802.11s recommends [802.11s Requirements] using an IEEE 802.11 MAC DATA header to forward packets in multihop wireless networks. Hence the multihop packet forwarding is done in the MAC layer itself and is transparent to higher layers which see the 802.11s mesh as a single LAN segment. Devices which are not forwarding capable or non-routable (e.g. 802.11 stations (STAs)) are proxied by routable devices (e.g. an access point (AP) capable of routing). Typically, the routable device takes care of forwarding packets on behalf of the non-routable device. This eliminates the need of maintaining/running any routing protocols at the end stations and provides backward compatibility with IEEE 802.11. For example, when the node 200 is a routable device, the node 200 can include a routing manager 230 as illustrated in FIG. 2 for forwarding packets on behalf of non routable stations within the network 100.

In accordance with the present invention, the processor 215 includes the routing manager 230 for managing packet forwarding within the communication network 100. It will be appreciated by those of ordinary skill in the art that the routing manager 230 can be hard coded or programmed into the node 200 during manufacturing, can be programmed over-the-air upon customer subscription, or can be a downloadable application. It will be appreciated that other programming methods can be utilized for programming the routing manager 230 into the node 200. It will be further appreciated by one of ordinary skill in the art that route manager 230 can be hardware circuitry within the node 200. In accordance with the present invention, the routing manager 230 can be contained within the processor 215 as illustrated, or alternatively can be an individual block operatively coupled to the processor 215 (not shown).

To perform the necessary functions of the node 200, the processor 215 and/or the routing manager 230 are each coupled to the memory 220, which preferably includes a random access memory (RAM), a read-only memory (ROM), an electrically erasable programmable read-only memory (EEPROM), and flash memory. The memory 220, in accordance with the present invention, includes storage locations for the storage of a proxy table 240, and a routing table 245. The memory 220 further includes storage locations for the storage of one or more identifying address 235 such as the MAC address of the node 200.

It will be appreciated by those of ordinary skill in the art that the memory 220 can be integrated within the node 200, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the node 200.

In accordance with the present invention, proxy routing provides the capability to support non-meshed devices joining a mesh network. The lack of a mechanism to inform the source/intermediate nodes about the attach point change of a non-meshed device in the network can lead to data packet loss within a network. The present invention provides a way to inform the related nodes about the attach point change of a non-meshed device.

To assist in describing the various embodiments of the invention, the following definitions are provided:
 a. Meshed Device—A device which may follow a standard wireless protocol such as IEEE 802.11 or IEEE 802.15. These devices are responsible for forwarding packets to/from the proxy devices which are associated with them.
 b. Non-Meshed Device—A device following a standard wireless protocol such as IEEE 802.11 or IEEE 802.15 but not participating in any kind of routing. These devices are "proxied" by meshed devices, which establish routes for them.

Figure 3:
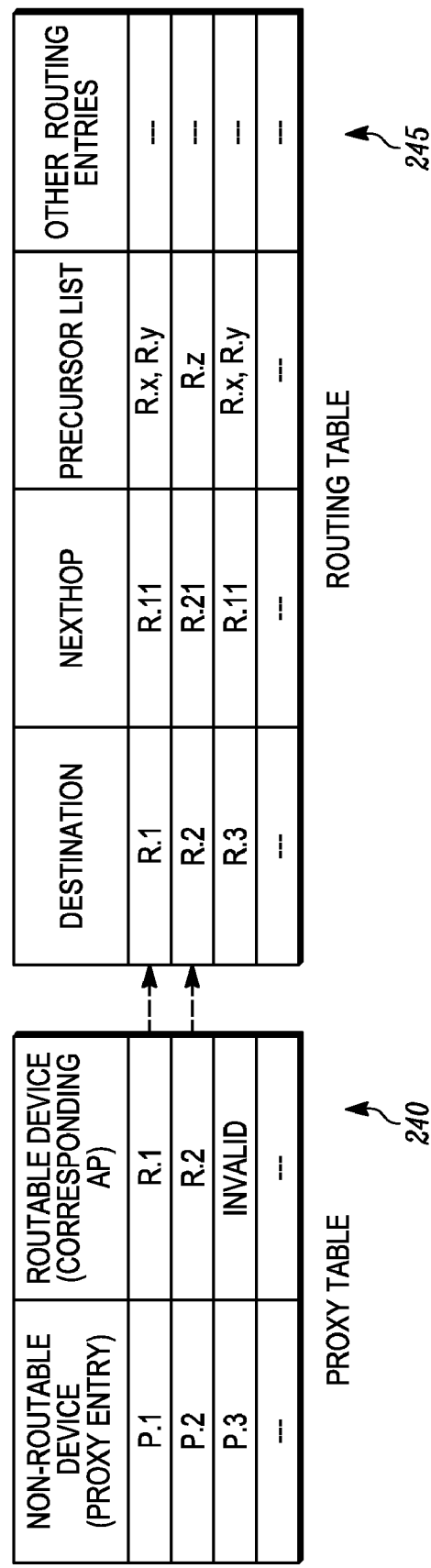
FIG. 3 is a block diagram illustrating a proxy table and a routing table for use within the mobile node of FIG. 2.

A typical layout of the proxy table 240 and the routing table 245 maintained at each routing device such as the node 200 is illustrated in FIG. 3. The routing table 245 and the proxy table 240 are maintained to identify a non-routable device and their corresponding AP (routable device). These tables can also be combined to create a single forwarding table.

The proxy table 240 typically contains an entry for each device that is associated with the node 200 (i.e. each device that is being proxied by the node 200). A node 200 can also have nodes or devices associated with it through a wired Ethernet port or through some other wired/wireless protocol like IEEE 802.15, Token Ring, or the like as can be appreciated by one skilled in the art. A proxy table 240 of a node may also contain entries for non-meshed devices that are associated with other nodes but use that node as an intermediate node to communicate with other devices in the network. Each entry in the proxy table 240 may include one or more of the following pieces of information:
 Device media access control (MAC) Address (if MAC addressing scheme is used)
 Device IP address (if IP addressing scheme is used)
 Device ID (if an addressing scheme other than IP or MAC is used)
 Static or Dynamic Entry (i.e. whether the entry is static or dynamic)
 Associated AP address (the address can be MAC address, IP address or other device ID depending on which addressing scheme is used—this entry is used if node is maintaining association information for non-meshed nodes associated with other AP. This is useful when a four (4) addressing scheme is used in the network)
 Expiration time of the entry In accordance with the present invention, non-meshed devices are proxied by meshed devices. Each meshed device maintains the proxy table 240 and the routing table 245 as, for example, illustrated in FIG. 3. The routing table 245 maintains routes to other meshed devices. The node 200 updates its routing table 245 so as to maintain a consistent and up-to-date view of the network. When the network topology changes the nodes propagate update messages throughout the network in order to maintain consistent and up-to-date routing information about the whole network. These routing protocols vary in the method by which the topology change information is distributed across the network and the number of necessary routing-related tables.

The routing manager 230 of the node 200 consults both the proxy table 240 and the routing table 245 to determine how to forward a packet.

An IEEE 802.11 MAC DATA header includes address fields which can be utilized for identifying MAC addresses associated with the routing of various communication packets.

Figure 4:
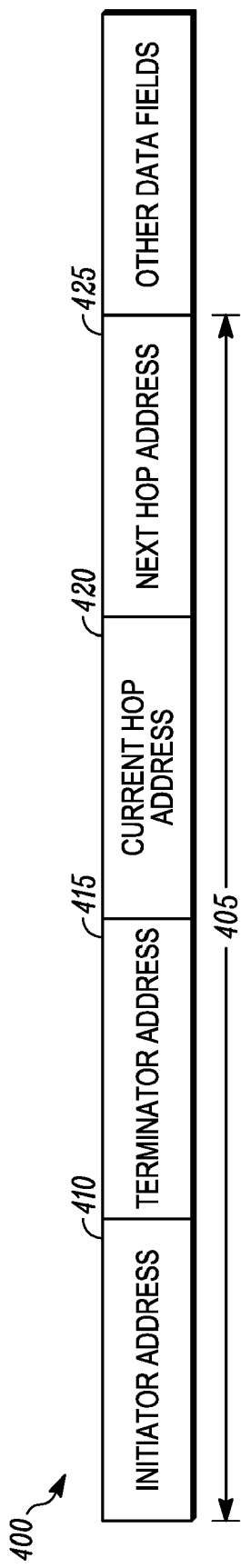
FIG. 4 illustrates an exemplary Mesh DATA Packet Format in accordance with some embodiments of the present invention.

As illustrated in FIG. 4, in a four address implementation of the present invention, the data frame 400 includes four addresses in its data header 405 to indicate: (a) an initiator MAC Address 410 which is the MAC address of the real frame source node; (b) a terminator MAC Address 415 which is the MAC address of the real frame destination node; (c) a current hop MAC address 420 (i.e. a transmitter address (TA) in an 802.11 header) which is the current transmitting node of the frame; and (d) a next hop MAC Address 425 (i.e. a receiver address (RA) in an 802.11 header) which is the current receiving node of the frame.

Figure 5:
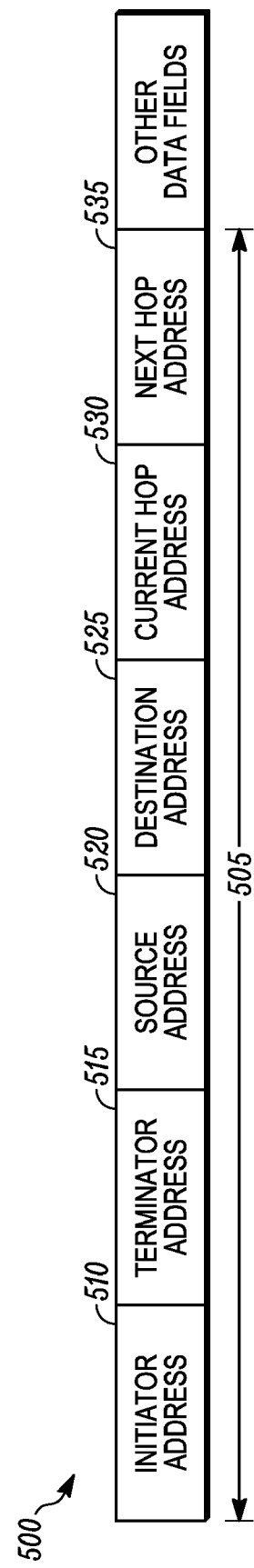
FIG. 5 illustrates an alternative exemplary Mesh DATA Packet Format in accordance with some embodiments of the present invention.

As illustrated in FIG. 5, in a six address implementation of the present invention, the data frame 500 includes six addresses in its data header 505 to indicate: (a) an initiator MAC address 510 which is the MAC address of the real frame source node; (b) a terminator MAC address 515 which is the MAC address of the real frame destination node; (c) a source/originator MAC address 520 which is the MAC address of the mesh ingress node for the frame; (d) a destination MAC address 525 which is the MAC address of the mesh egress node for the frame; (e) a current hop MAC Address 530 (i.e. a transmitter address (TA) in an 802.11 header) which is the current transmitting node of the frame; and (f) a next hop MAC address 535 (i.e. a receiver address (RA) in an 802.11 header) which is the current receiving node of the frame.

In the case where a destination is a non-routable device, special care needs to taken in the routing protocol design itself, so that intermediate nodes after receiving packets know which routable device to forward the packet to. This is generally done by using the proxy table 240 at each routable device. In the case where the destination is a non-routable device, intermediate nodes after receiving the packet use their proxy table 240 to identify the corresponding proxied routable device, and use the routing table to get the immediate next hop to forward the DATA packet. This is the general mechanism of forwarding packets using an IEEE 802.11 MAC header.

The proxy table 240, for example, in the four address implementation, is maintained for all known non-meshed devices and their associated meshed devices (including itself). The proxy table 240, for example, in the six address implementation, is maintained for non-meshed devices associated with itself and non-meshed devices communicating with itself or its associated non-meshed devices.

The present invention provides for two alternative methods for the data frame forwarding. One method utilizes a four-address scheme and one method utilizes a six-address scheme.

In the four-address scheme, the proxy information is distributed into the network along the active routes. When the data frame 400 is forwarded in the network, four addresses will be carried in the data frame header 405 as illustrated in FIG. 4 previously herein. Each node along the route will use its proxy table 240 to map the terminator node to its associated meshed node (the meshed destination node), and get the next hop node from its route table 245 using the meshed destination node address.

In the six-address scheme, the proxy information is only maintained by the meshed device directly proxying the non-meshed device and the end points of the route in the mesh network. When the data frame 500 is forwarded in the network, six addresses will be carried in the data frame header 505 as illustrated in FIG. 5 previously herein. Each node along the route will get the next hop node address from its route table 245 using the meshed destination node address.

In both schemes, when the terminator node moves away from the destination meshed device, the initiator and source meshed devices will not be aware of this change immediately. The source meshed device will keep sending the data traffic using the existing route to reach the destination meshed device and expect that the destination meshed device is able to forward the data traffic to the non-meshed terminator node. However, at this point the destination meshed device can not reach the non-meshed terminator node any more.

Figures 6, 7:
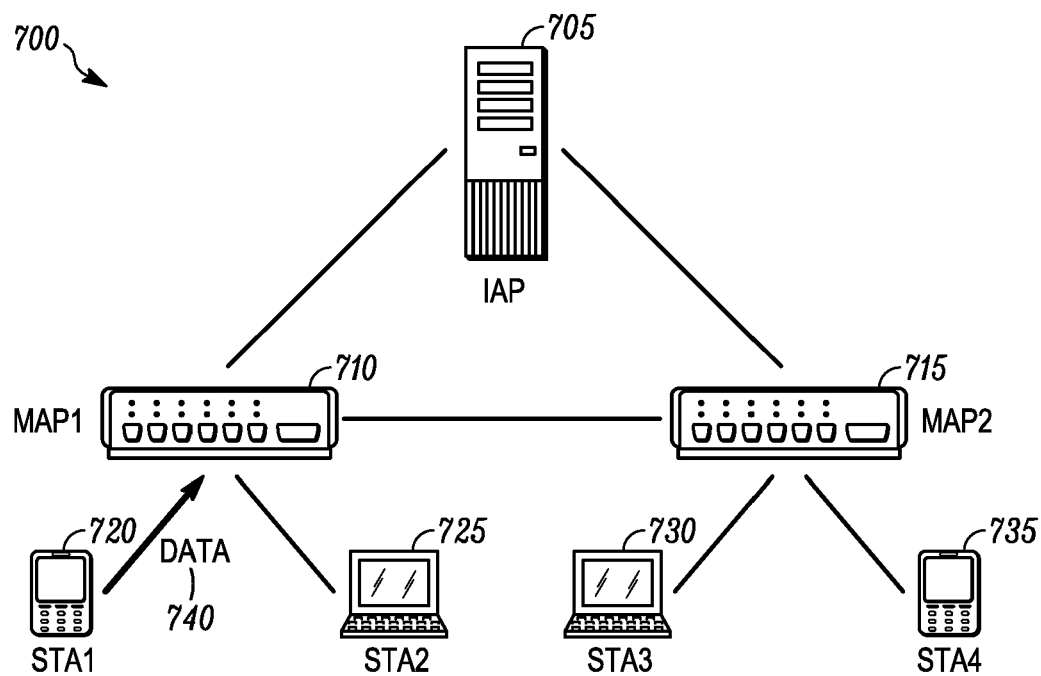
FIG. 6 illustrates a proxy error reference packet format for use within the network of FIG. 1 in accordance with some embodiments of the present invention.
FIGS. 7 through 10 illustrate an exemplary operation of a network in accordance with some embodiments of the present invention.

The present invention provides for the generation of a proxy error (PERR) packet from the destination meshed device to inform the source meshed device that the non-meshed terminator node is not proxied by the known destination meshed device. As illustrated in FIG. 6, a PERR packet 600 includes an originator meshed device address 605, a destination meshed device address 610, and a moved terminator non-meshed device address 615. The PERR packet 600 is unicast back to the source meshed device.

Ad Ho' State:

Six-Address Scheme

In the six-address scheme of the present invention, each node maintains a proxy table for itself and for the communicating nodes. When the destination meshed device receives the data packet, from the six-address header it will find that the real destination is the non-meshed terminator node which was associated with it. In the situation where the terminator node has moved away, the destination meshed device generates the PERR to report that the terminator node is not reachable through it. The destination meshed device will put its own address in the destination address field, copy the source meshed device address from the packet header to the source meshed device address field in the PERR, and copy the terminator device address from the packet header to the terminator non-meshed device address in the PERR. The PERR packet will be unicast back to the source meshed device along the reverse route.

Four-Address Scheme

In the four-address scheme of the present invention, each node in the network maintains the proxy table for itself, the nodes that this device or its proxied devices are communicating to, and other nodes using it as the intermediate node to forward traffic.

In the proxy table, each entry may include one or more of the following pieces information:
Non-meshed device address,
Meshed device address indicating the meshed device is proxying for the non-meshed device,
A timer There are several cases that the proxy table will be updated as will be described below.

When a non-meshed device is associated with the meshed device, the meshed device will create an entry in its proxy table for this non-meshed device, indicate that the non-meshed device is proxied by this meshed device, and start an expiration timer to indicate the active entry lifetime. There are three cases that the entry can be invalidated:
If there is no activity during this active entry lifetime from the non-meshed device, or
The non-meshed device is explicitly disassociated with the meshed device, or
The meshed device detects that the non-meshed device is not reachable through layer2 feedback, In all such cases, the entry should be removed from the proxy table.

A routable device generates a Route Request (RREQ) packet when it receives a packet for an unknown destination and/or if the packet is originated by itself or by some non-routable device proxied by itself. When a meshed device receives a RREQ, it will create an entry for the originator non-meshed device in the proxy table if it does not exist. The meshed device copies the originator address in the RREQ into the non-meshed device address field, and copies the source address in the RREQ into the meshed device address field in the new proxy table entry, and starts an expiration timer to indicate the active entry lifetime.

When a node receives a RREQ, it consults its proxy table as well as its routing table to check if it is the destination of the RREQ packet or the destination is currently proxied by itself. If any of the two conditions is true, the node generates a Route Reply (RREP) packet and sends it towards the source. When a meshed device receives a RREP, it will create an entry for the terminator non-meshed device in the proxy table if it does not exist. The meshed device copies the terminator address in the RREP into the non-meshed device address filed, and copies the destination address in the RREP into the meshed device address field in the new proxy table entry, and starts an expiration timer to indicate the active entry lifetime.

When the meshed device forwards traffic between a pair of non-meshed devices, the proxy entry lifetimes for both non-meshed devices is extended. When there is no activity for a non-meshed device during the active entry lifetime, the proxy entry should be removed from the proxy table.

When the meshed device forwards a four-address packet to a destination node, it will check its proxy table and route table to identify the type of the destination node, i.e. meshed device or non-meshed device. Exemplary cases are described below:

Case 1: The destination node is in the proxy table and the associated meshed device is the receiving node: the meshed device will then forward the packet to the terminator node directly;

Case 2: The destination node is in the proxy table and the associated meshed device is not the receiving node: the meshed device will forward the data packet according to the four-address forwarding scheme, and will not generate the PERR. If the route is not available for the destination meshed device, then a Route Error (RERR) for the destination meshed device is generated following standard routing protocol rules (i.e. the Ad-hoc On-demand Distance Vector (AODV) routing rules; see, for example, C. Perkins, E. Belding-Royer, and S. Das, "RFC 3561—Ad hoc On-Demand Distance Vector (AODV) Routing");

Case 3: The destination node is not in the proxy table and it is also not in the route table: the meshed device will generate the PERR. The meshed device checks the others' proxy table to get the source meshed node which is proxying for the originator non-meshed device. In the PERR, it copies the terminator node address into the unreachable terminating address field, puts the source meshed node address into the source meshed device field. The PERR is then unicast back to the source meshed device along the reverse route;

Case 4: The destination node is not in the proxy table, but it is in the route table with valid route entry: the node forwards the packet according to the routing information in the route table;

Case 5: The destination node is not in the proxy table, but it is in the route table with invalid route entry: the node generates a RERR following the AODV routing rule. (i.e. see, for example, C. Perkins, E. Belding-Royer, and S. Das, "RFC 3561—Ad hoc On-Demand Distance Vector (AODV) Routing".)

When the intermediate node receives the PERR, it updates its proxy table by removing the entry indicated by the unreachable terminating address. When the source meshed node receives the PERR, it generates a RREQ with the terminator address the same as the unreachable terminating address carried in the PERR.

Infrastructure State:

When an Intelligent Access Point (IAP) is present in the network, we may, for example, follow the Mesh Scalable Routing (MSR) infrastructure state to forward the data traffic.

Six-Address Scheme:

In the six-address scheme, every step for the PERR generation and forwarding should be same as in the ad hoc state six-address scheme. Additionally, when the reverse route is not available, the PERR can be forwarded to the IAP, and the IAP can be responsible for forwarding the PERR to the source meshed device indicated by the source address field in the PERR.

Four-Address Scheme:

In the four-address scheme, every step for the PERR generation and forwarding is the same as in the ad hoc state four-address scheme. Additionally, when the reverse route is not available, the PERR can be forwarded to the IAP, and the IAP can be responsible for forwarding the PERR to the source meshed device indicated by the source address field in the PERR.

It will be appreciated by those of ordinary skill in the art that in the four-address scheme in the infrastructure state, initially when there is no route to the destination, the source meshed device forwards the data to the IAP. The present invention optionally includes a flag in the data packet indicating that this packet should be forwarded to the IAP to reach the destination. When the intermediate node gets such a data packet, it will forward it to the IAP directly without checking the proxy table. Only for the data packet without this flag set, the intermediate node will follow the rules specified above to check the route availability for the destination device, and decide whether the PERR should be generated.

FIGS. 7 through 10 illustrate an exemplary operation of a network in accordance with some embodiments of the present invention.

As illustrated in FIG. 7, a network 700 includes an intelligent access point (IAP) 705, two meshed access points (MAP1 710, MAP2 715), and four stations (STA1 720, STA2 725, STA3 730, STA4 735). In the exemplary operation, STA1 720 tries to send data 740 to STA4 735.

Figure 8:
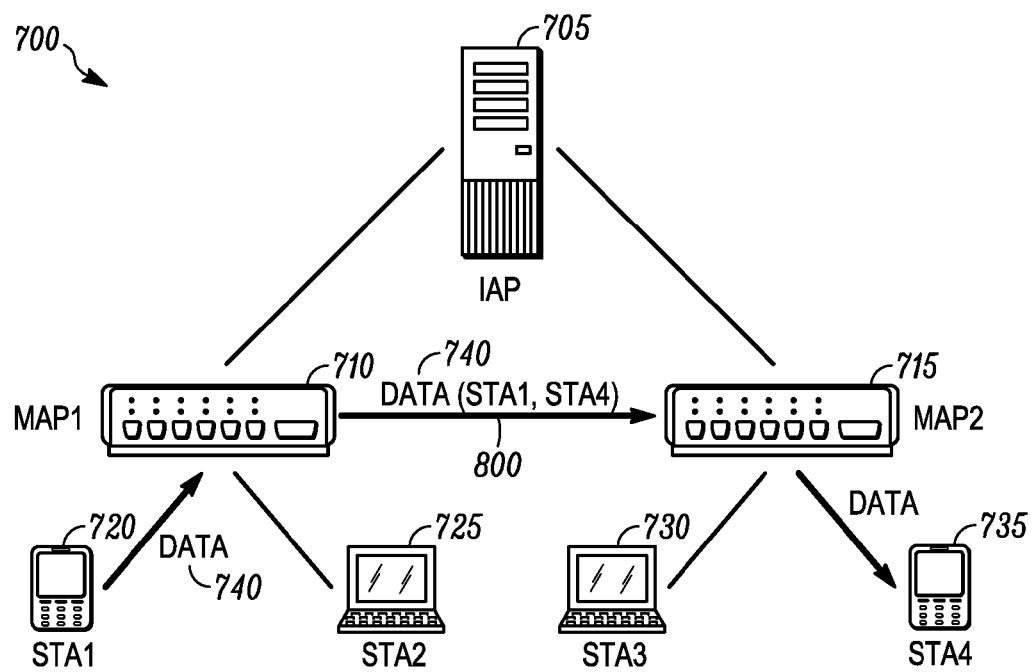

Next, as illustrated in FIG. 8, MAP1 710, in response to STA1 720 requesting to send the data 740 to STA4 735, starts to use an optimum route 800 to forward the data 740 to STA4 735 through MAP2 715.

Figure 9:
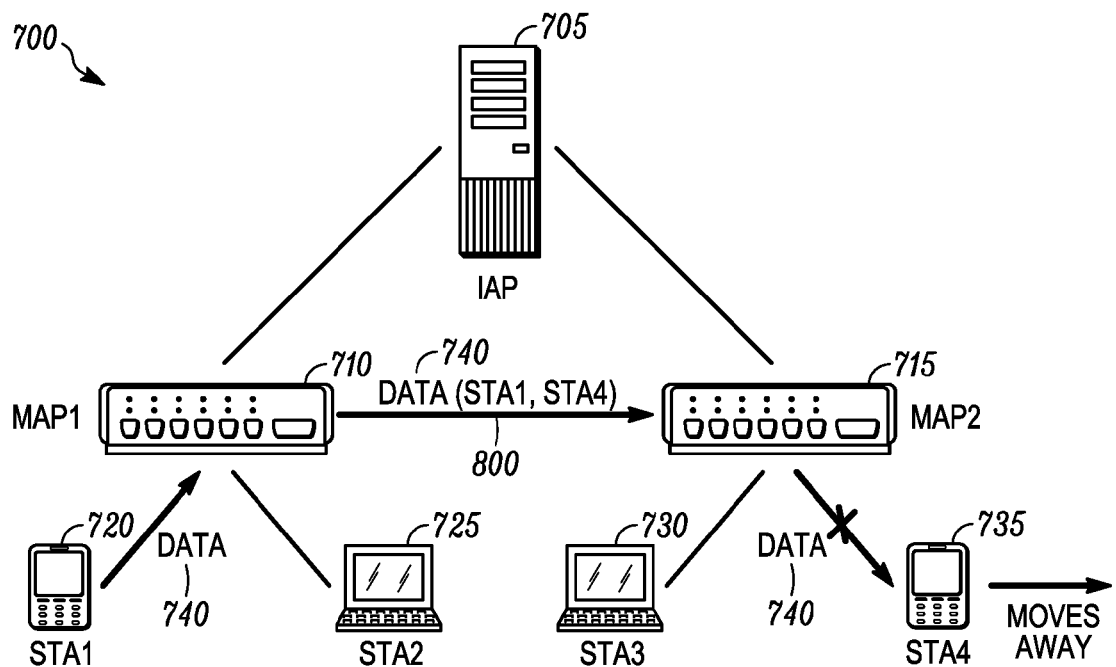

However, as illustrated in FIG. 9, prior to receiving the data 740, STA4 735 moves away, and MAP2 715 removes it from its proxy table. MAP1 710 is not aware of the change, and keeps sending the data 740 for STA1 720 to STA4 735 through MAP2 715. In other words, in FIG. 9, the terminating station STA4 735 moves away, but the originating station STA1 720 and the source device MAP1 710 are not aware of this change and keep sending the traffic to MAP2 715.

Figure 10:
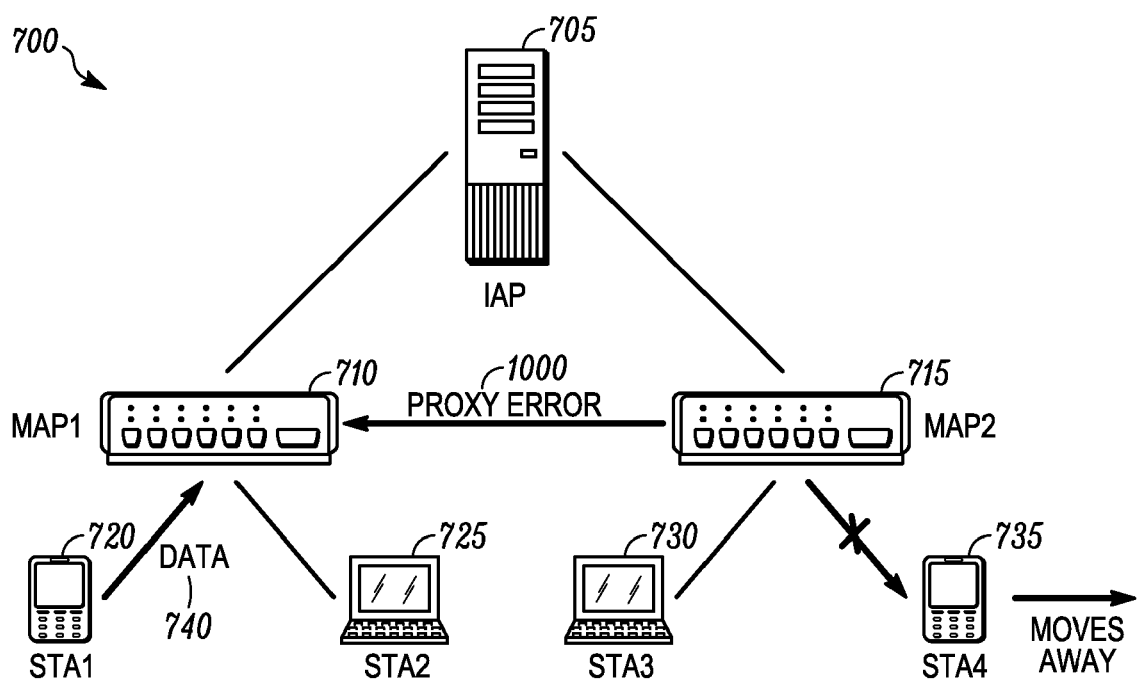

In accordance with the present invention, as illustrated in FIG. 10, MAP2 715 sends a Proxy Error (PERR) 1000 back to MAP1 710 to inform MAP1 710 that the STA4 735 is not proxied by MAP2 715 any more. In other words, in FIG. 10, upon receiving the data 740 from the STA1 720, the MAP2 715 sends the Proxy Error 1000 back to MAP1 710 to inform it that the STA4 735 has moved away. In accordance with the present invention, upon the reception of the PERR 1000, MAP1 710 updates its proxy table to remove the obsolete entry showing STA4 proxied by the MAP2, and starts a new route discovery process for STA4 735 again.

As described herein the present invention solves the obsolete proxy information purging issue in the mesh networks with non-meshed devices joining the network through the meshed devices. The present invention provides a way to distribute the attach point change of a non-meshed device in the network, and completes the proxy routing protocol.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for distributing proxying error information in a wireless network comprising a plurality of nodes, the method comprising:
    associating a proxy node with a non-routable node, wherein the proxy node includes a proxy table;
    sending a data packet from an originator node to the proxy node for delivery to the non-routable node;
    disassociating the non-routable node from the proxy node;
    updating the proxy table by the proxy node to remove the non-routable node from the proxy table;
    determining by the proxy node that the non-routable device has disassociated from the proxy node by the proxy node determining that the non-routable node is not included within the proxy table;
    sending a proxy error message from the proxy node to the originator node to inform the originator node that the non-routable node is no longer proxied by the proxy node; and
    starting a route discovery process for the non-routable node by the originator node.

2. A method for distributing proxying error information as claimed in claim 1,
    wherein the sending the data packet step comprises sending the data packet from the originator node through at least one intermediary node to the proxy node, the method further comprising:
    sending the proxy error message from the proxy node to the at least one intermediary node.

3. A method for distributing proxying error information as claimed in claim 2, wherein the intermediary node includes a proxy table, the method further comprising:
    receiving the proxy error message at the intermediary node; and
    updating the proxy table of the intermediary node to remove the association of the proxy node with the non-routable node.

4. A method for distributing proxying error information as claimed in claim 2, wherein the intermediary node includes a proxy table, the method further comprising prior to the sending the data packet step:
    identifying the proxy node associated with the non-routable node by the intermediary node using the proxy table.

5. A method for distributing proxying error information as claimed in claim 1, wherein the originating node includes a proxy table, the method further comprising:
    receiving the proxy error message by the originating node; and
    updating the proxy table of the originating node to remove the association of the proxy node with the non-routable node.

6. A method for distributing proxying error information as claimed in claim 1, wherein the originating node includes a proxy table, the method further comprising prior to the sending the data packet step:
    identifying the proxy node associated with the non-routable node by the originating node using the proxy table.

7. A method for distributing proxying error information as claimed in claim 1, further comprising prior to the determining step:
    geographically relocating the non-routable node; and
    causing the disassociating of the non-routable node from the proxy node by the geographically relocating of the non-routable node.

8. A method for distributing proxying error information as claimed in claim 1, wherein the proxy error message comprises:
    an originator node address,
    a proxy node address and
    a non-routable node address.

* * * * *